United States Patent [19]
Schutz

[11] Patent Number: 5,253,777
[45] Date of Patent: Oct. 19, 1993

[54] PALLET CONTAINER

[76] Inventor: Udo Schutz, Ruckersteg 4, Selters, Fed. Rep. of Germany

[21] Appl. No.: 851,897

[22] Filed: Mar. 16, 1992

[30] Foreign Application Priority Data

Mar. 15, 1991 [DE] Fed. Rep. of Germany ....... 4108399
Nov. 11, 1991 [DE] Fed. Rep. of Germany ....... 4136963

[51] Int. Cl.$^5$ ............................................. B65D 21/02
[52] U.S. Cl. .................................... 220/571; 206/386; 206/508; 220/630; 220/636
[58] Field of Search ................. 220/571, DIG. 6, 630, 220/636; 206/386, 598, 599, 508, 503

[56] References Cited

U.S. PATENT DOCUMENTS

| | | | |
|---|---|---|---|
| 4,733,790 | 3/1988 | Stein | 220/571 |
| 5,019,346 | 5/1991 | Richter et al. | 220/571 |
| 5,033,638 | 7/1991 | Cruver et al. | 220/571 |
| 5,099,873 | 3/1992 | Sanchez | 220/571 |
| 5,161,690 | 11/1990 | Foshaug | 220/571 |

FOREIGN PATENT DOCUMENTS

| | | |
|---|---|---|
| 0363668 | 4/1990 | European Pat. Off. . |
| 2947603 | 10/1981 | Fed. Rep. of Germany . |
| 3039635 | 10/1985 | Fed. Rep. of Germany . |
| 3418301 | 11/1990 | Fed. Rep. of Germany . |

*Primary Examiner*—Joseph Man-Fu Moy
*Attorney, Agent, or Firm*—Young & Thompson

[57] ABSTRACT

The pallet container (101) for liquids comprises an exchangeable inner container (102) of a synthetic resin, an outer jacket (106) of a latticework, as well as a pallet (109) fashioned as a floor pan (110), this pallet receiving in flush manner the bottom (111) of the inner container designed as a drainage bottom, the bottom exhibiting a filling connection (103) as well as a discharge connection (115) with a drainage tap (105). Reinforcing creases (118a, 118b) are molded into the floor pan (110) adapted to the inclination of the drainage bottom (111); the bases (119) of these creases lie in a joint horizontal plane (120—120). The flat floor pan (110) exhibits a downwardly drawn outer supporting rim (117) and, in the zone of the reinforcing creases (118a, 118b) and of the supporting rim (117), is riveted or welded with a flat lower bottom (121) or a bottom frame of sheet metal to form a hollow-chamber bottom with closed and/or open chambers (123) and a continuously extending outer hollow supporting collar (124).

22 Claims, 21 Drawing Sheets

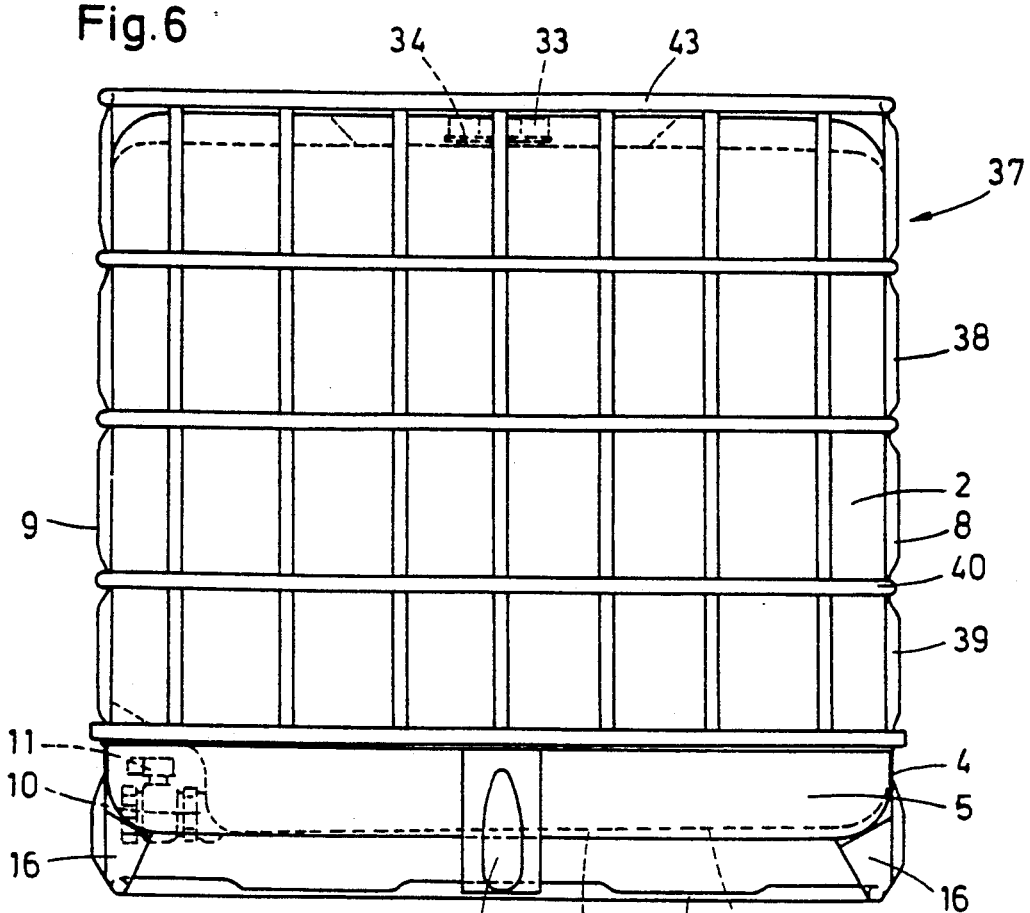
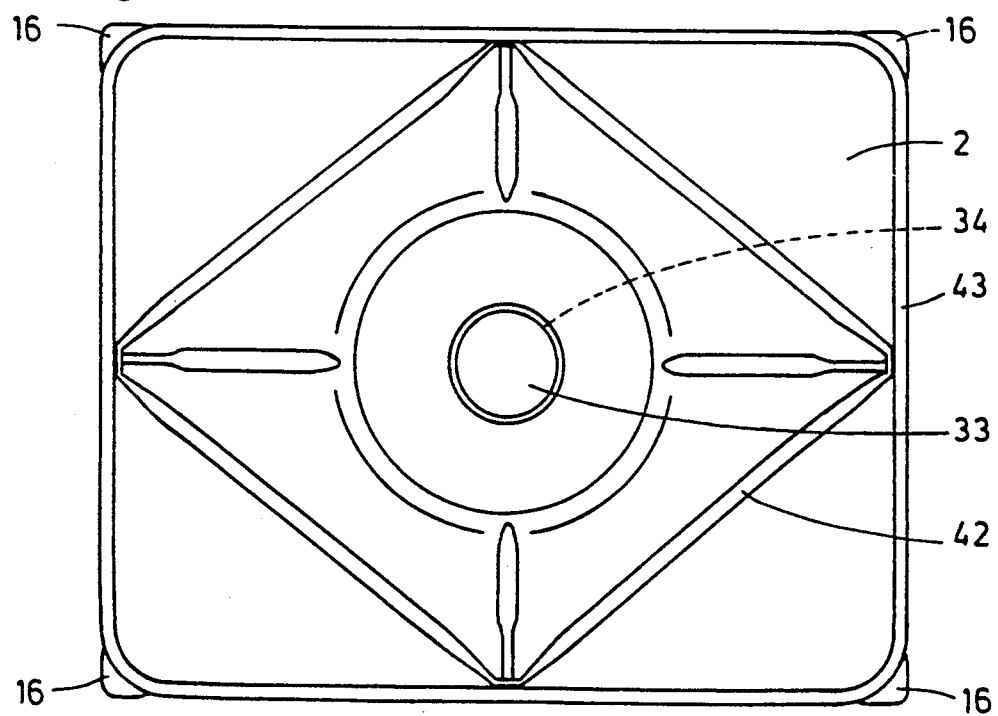

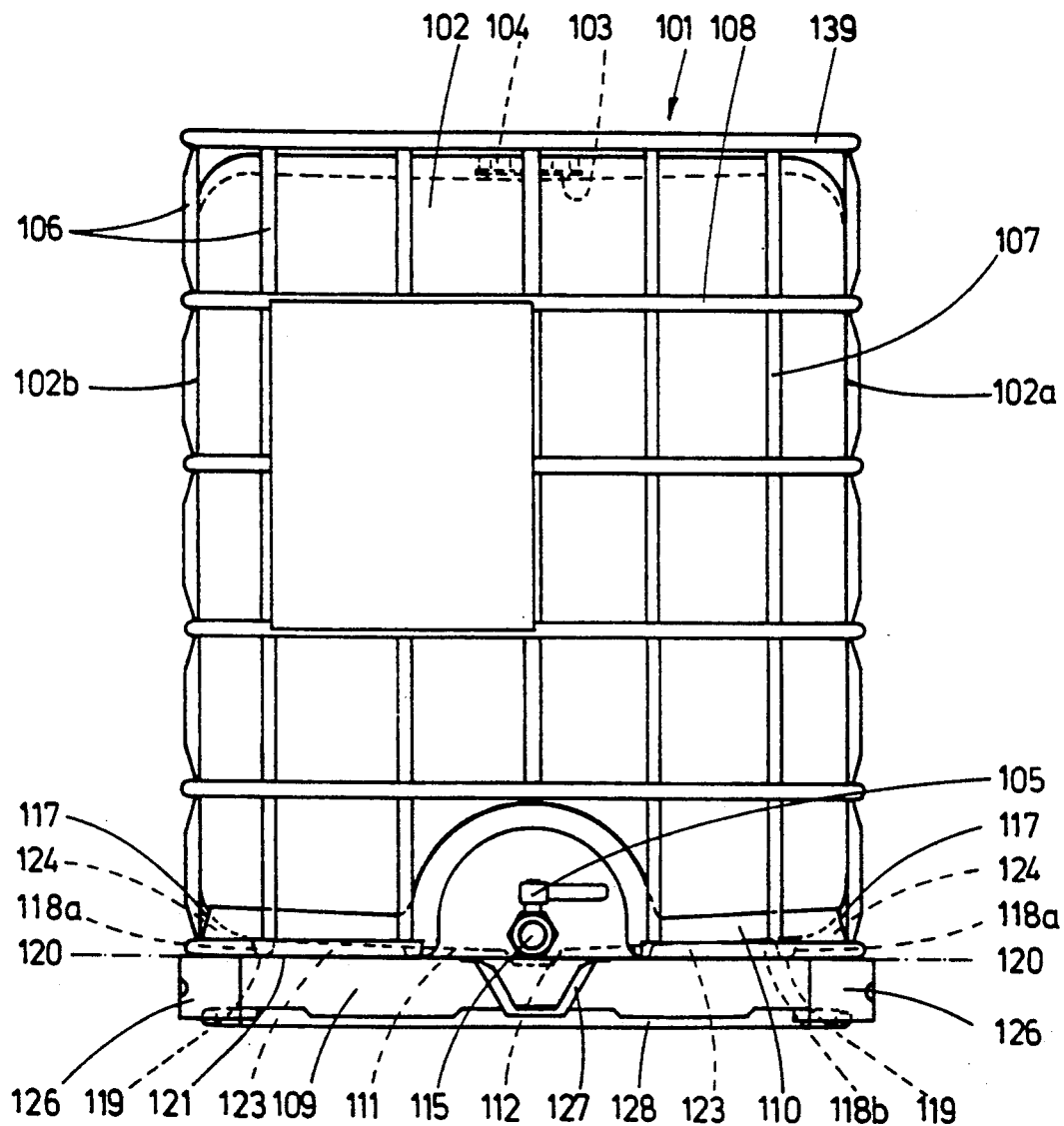

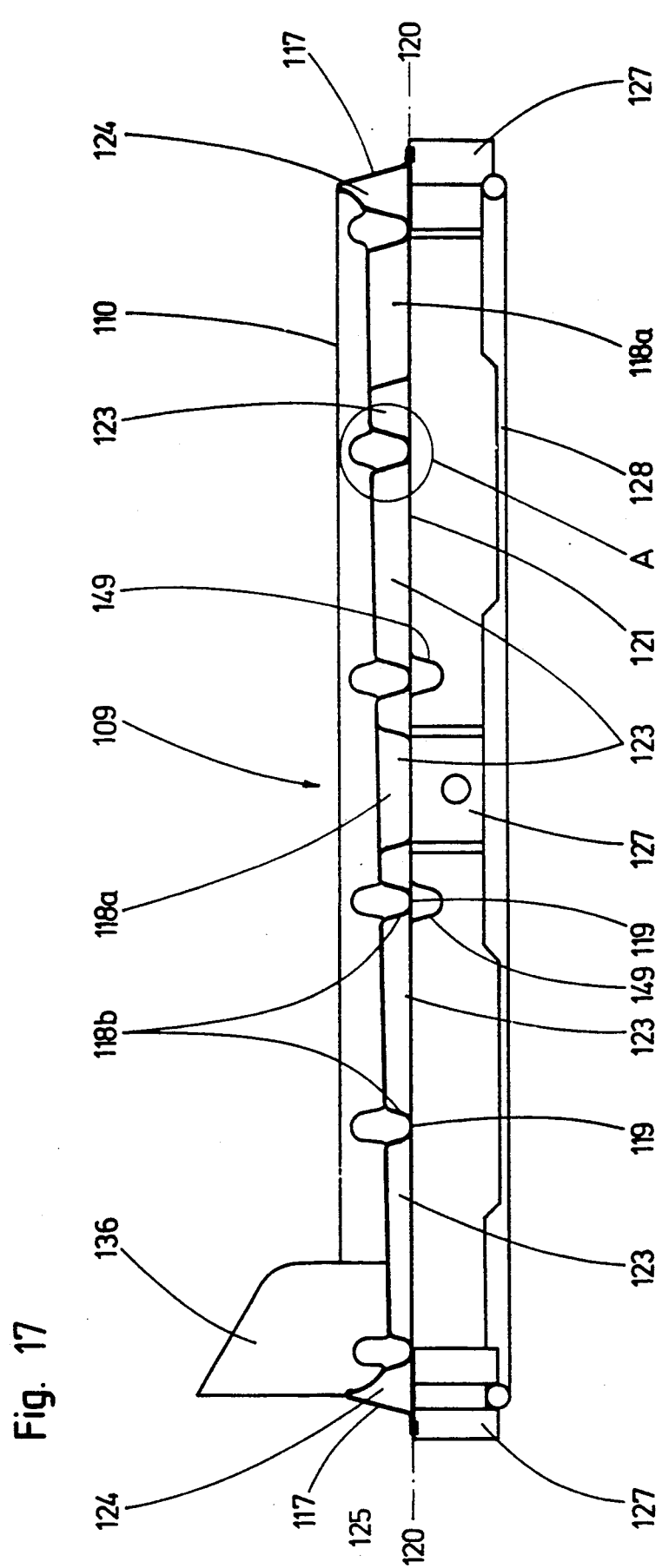

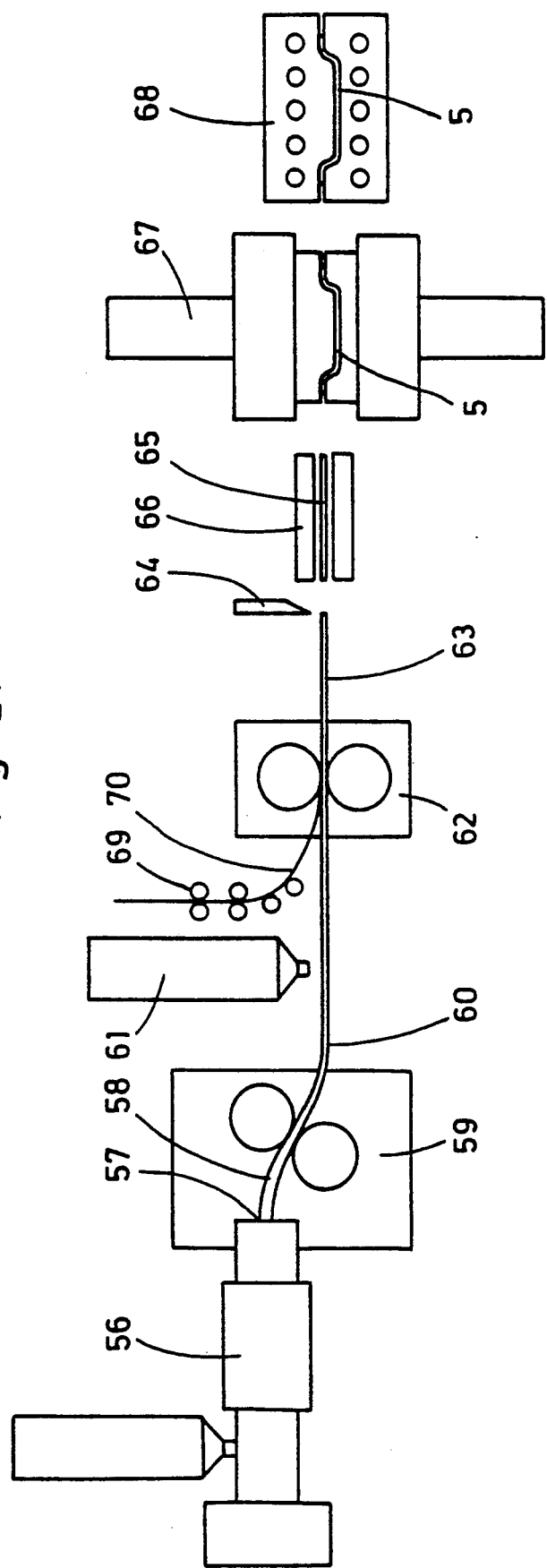

PALLET CONTAINER

FIELD OF THE INVENTION

The invention relates to pallet containers for liquids with an inner container of a synthetic resin with respectively one sealable filling opening and discharge opening and with an outer jacket of metal in contact with the inner container, as well as with a bottom fashioned as a pallet wherein the pallet is adapted to being handled by means of stacker lifting trucks, shelf-servicing devices, or the like (EP 363,668 A1).

BACKGROUND OF THE INVENTION

A pallet container is known from DE 3,418,301 C2 comprising an inner container of plastic which is surrounded, for the purpose of stacking, by a supporting frame in the form of a casing in contact with the plastic inner container, this casing exhibiting a sheet-metal jacket with a lid and a bottom and being equipped with strongly rounded upending edges and corners. This casing is mounted on a flat pallet of wood, cutouts in the lid and in the sheet-metal jacket permitting access to the filling and, respectively, discharge openings of the container.

The wooden pallet utilized in this known pallet container is not suitable, on account of the unsatisfactory dimensional stability due to the wooden material, for stacking in high-level shelf storage facilities by means of shelf-servicing devices, the use of which requires stacking goods having positioning surfaces permitting exact stacking of the stacking item into and a flawless removal of the stacking item out of high-level shelf storage facilities. Furthermore, the wooden pallet has a shorter lifetime as compared with the outer jacket with bottom and lid of steel sheet whereby a premature replacement of the container becomes necessary when utilizing the pallet container as a multiple-trip container.

The pallet container known from DE 3,039,635 C2, with a plastic inner container attached to a wooden pallet and exhibiting an outer jacket of intersecting, horizontal and vertical lattice bars of metal, exhibits the same disadvantages as the pallet container according to DE 3,418,301 C2.

The pallet container according to DE 2,947,603 C2, with a steel-tube pallet on which a plastic inner container with a sheet-metal jacket is mounted, does avoid the aforedescribed drawbacks of known pallet containers with wooden pallet, but still shares the disadvantages with this prior art that, for reasons of fixation and stability, the plastic inner container must be attached to the pallet with a separate bottom, and that residual emptying is very cumbersome inasmuch as the pallet must be lifted, for this purpose, on the side in opposition to the emptying aperture of the inner container.

The pallet container of this type in accordance with EP 363,668 A1 has an outer jacket made up of horizontal and vertical lattice bars of round steel welded together at the points of intersection. The pallet, fashioned as a bottom, consists of a lattice with intersecting lattice bars forming a grating-like bottom surface and bent into feet in the downward direction at the rim of the bottom surface, these feet defining a certain distance of the bottom surface with respect to the placement surface of the pallet container. The vertical lattice bars of the outer jacket are extended into the zone of the setting-up surface and welded to the downwardly bent bars of the lattice bottom of the pallet.

For reasons of stability, the lattice bars of the lattice jacket and of the pallet formed as a lattice bottom must be dimensioned correspondingly strongly so that the pallet container according to EP 363,668 A1 has a high inherent weight which raises the shipping costs. Furthermore, this conventional pallet container is expensive from the viewpoint of manufacturing technique on account of the numerous welding spots. Finally, this pallet container is not designed, either, for convenient residual emptying.

In the pallet containers cited in connection with the state of the art, the pallets are in each case designed especially for the mounting of an outer jacket of sheet metal or of lattice bars for the plastic inner container.

The pallets of the above-described pallet containers are all subject to being endangered, impairing transport safety, by sonar vibrations emanating during transport from the liquid filling material and by vibrations transmitted by the transport vehicle.

SUMMARY OF THE INVENTION

The invention is based on the object of further developing the pallet container of the type discussed hereinabove with a view toward a module-type construction, making it possible to provide, with a basic pallet safe in transport, pallet containers with a plastic inner container and with a sheet-metal jacket and/or with a lattice-type jacket and pallet containers consisting merely of a sheet-metal container, wherein the bottom of the inner container and the pallet bottom are to be designed as drainage bottom for the automatic residual emptying of the pallet containers.

The pallet container according to the invention is distinguished by the following advantages:

The modular construction makes it possible to manufacture, with a basic pallet designed as a floor pan, pallet containers having a plastic inner container and an outer jacket of sheet metal and/or a latticework, and pallet containers designed as sheet-metal containers. The modular design permits an economical, inexpensive production of various types of pallet containers. The plastic inner container and the floor pan are equipped with an inclined drainage bottom for residual emptying of the pallet container. The pallet with a floor pan, which is either open at the bottom or closed by a lower bottom, ensures a handling of the pallet container by means of stacker lifting trucks, shelf-servicing devices, or the like, that is without problems. Positioning surfaces on the projecting corner and center feet of the pallet frame, which latter engages in the stack into the lid rim or the upper terminating profile of the lattice jacket of a lower pallet container, ensure an accurate positioning and stacking and a simple withdrawal of the pallet container by means of shelf-servicing devices to enter into or be removed from high-level storage shelves. By the use of a flat floor pan, with a lower bottom or lower frame of sheet metal, which receives the plastic inner container, wherein the floor pan exhibits hollow chambers and a continuously extending, outer hollow supporting collar, the pallet is distinguished by a good damping capacity and high rigidity in case of vibration stress as well as collision or impact stress, so that the pallet container fully satisfies the high requirements with regard to safety in transport and during accidents. The floor pan of the pallet can be manufactured as a deep-drawn part of sheet metal or as a press-molded part from a panel extruded from synthetic resin granule material. A pallet container with a floor pan of a synthetic resin has a substantially lower net weight as compared with a pallet container with a floor pan of sheet metal and thus entails lower shipping costs. For producing the plastic panels for press-molding the floor pans, it is possible to use, besides fresh synthetic resin granules, e.g. PE granulated material, also reprocessed granulated material that is ground from the plastic inner containers of used pallet containers, including the discharge valve made of plastic and the screw cap, likewise made of plastic, for attaching the valve to the discharge connection of the inner container. For manufacturing the sheet-metal containers of pallet containers without inner plastic container, intended particularly for the grocery industry, specially plated sheet-metals are suitable, for example with an inner sheet of stainless steel and an outer sheet of normal steel. The various pallet containers which can be equipped with a flexible inside liner of a synthetic resin film or with a composite metal-plastic film are especially suitable for use as multiple-trip containers that can be inexpensively reconditioned, to rid the environment of pollutants, by optimum residual emptying and a pollution-free destruction of the inside liner, for example by burning, and by an easy cleaning procedure.

BRIEF DESCRIPTION OF THE DRAWINGS

The invention will be described in greater detail below with reference to embodiments illustrated in the drawings wherein:

FIG. 6 is a lateral view, FIG. 7 is a top view, FIG. 15 shows a front view of a further embodiment of a pallet container with plastic inner container and lattice jacket, FIG. 17 is a longitudinal sectional view of the pallet along line XVII—XVII of FIG. 16 in an enlarged representation, FIG. 24 is a schematic view of a facility for producing floor pans of synthetic resin in the form of panels, for the various pallet containers.

DETAILED DESCRIPTION OF THE INVENTION

In the various embodiments of the pallet container, identical or similar components are identified by the same reference symbols.

Figure 1:
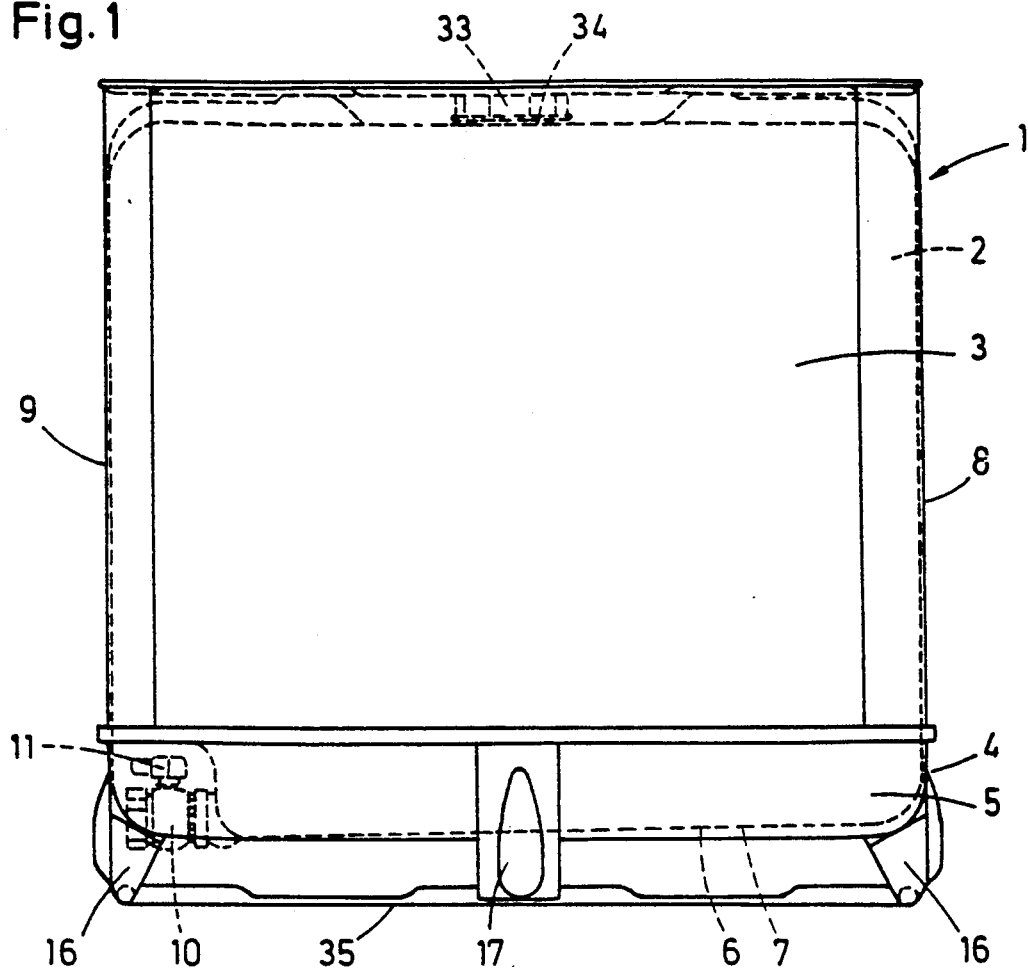
FIG. 1 is a lateral view.
Figure 2:
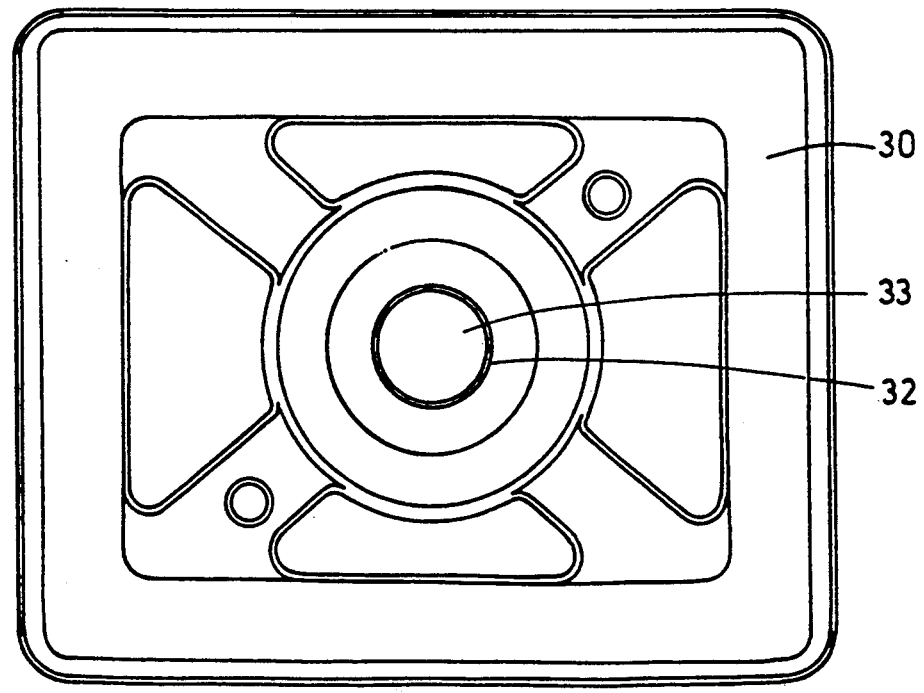
FIG. 2 is a top view.
Figure 3:
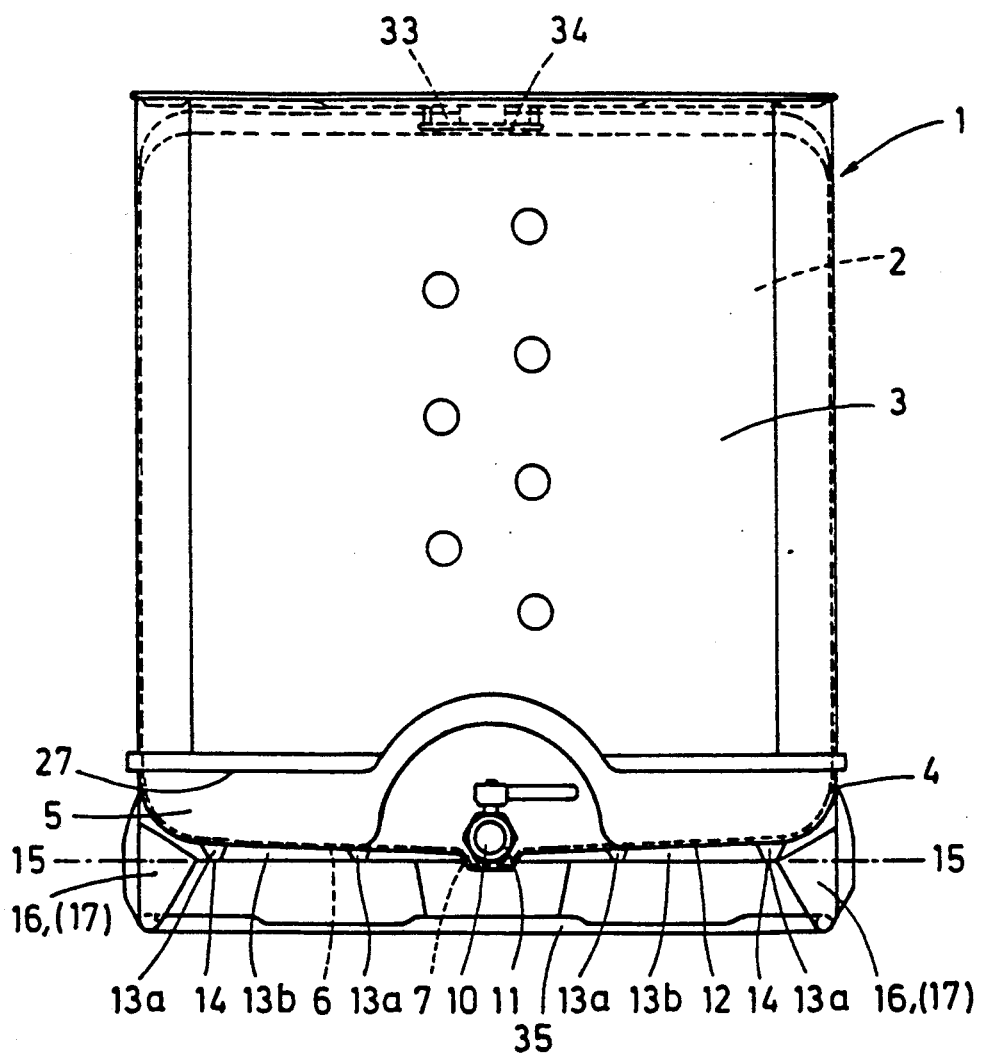
FIG. 3 is a front view of a pallet container with plastic inner container and sheet-metal jacket.

The pallet container 1 according to FIGS. 1 to 3 for the storage and for the transport of liquid exhibits as the main structural parts an exchangeable inner container 2 with a rectangular contour and rounded corners of polyethylene, an outer jacket 3 of sheet metal, as well as a pallet 4, designed as a floor pan 5 of sheet metal, with length and width dimensions meeting European standards, for the flush reception of the plastic inner container 2.

The bottom 6 of the inner container 2 is fashioned as a drainage bottom with a central, flat drainage channel 7 extending with a slight slope from the container rear wall 8 to the drainage connection 10 arranged at the front wall 9 of the container 2 for the connection of a drainage valve 11, preferably a ball valve or flap valve.

Figure 4:
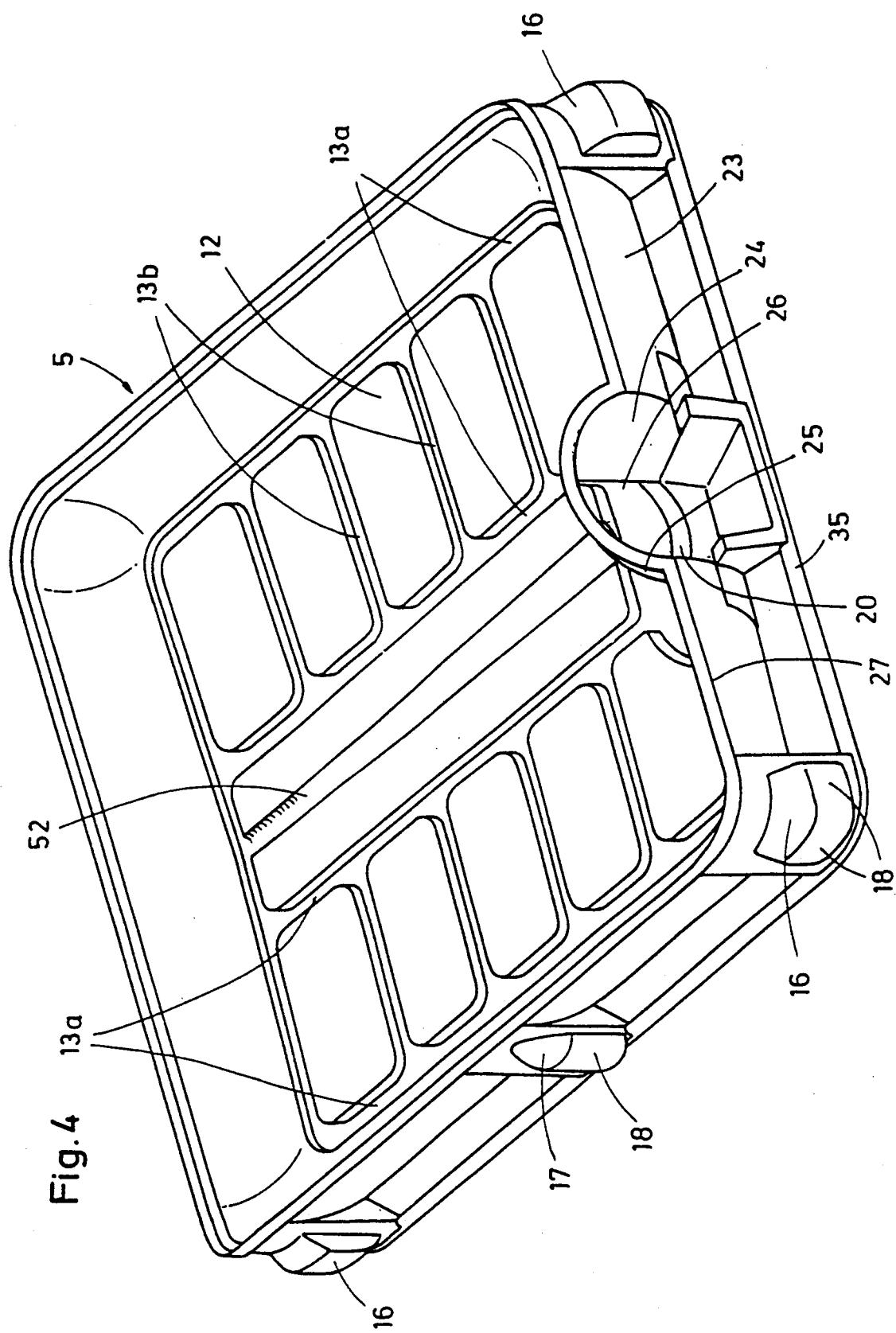
FIG. 4 is a perspective, enlarged view of the pallet, designed as a floor pan, of the container according to FIGS. 1-3.

The bottom 12 of the floor pan 5, adapted in its inclination to the drainage bottom 6 of the inner container 2, exhibits reinforcing creases 13a, 13b extending in the direction of and transversely to the drainage channel 7 of the inner container 2; the bases 14 of these creases lie in a joint horizontal plane 15—15 so that the pallet 4 rests, with the bottom 12 of the floor pan 5, horizontally on the grippers, not shown, pushed under the pan bottom 12 and pertaining to a forklift or a shelf-servicing device (FIGS. 3 and 4).

The floor pan 5 is mounted on projecting corner feet 16 and central feet 17 with externally located positioning surfaces 18 of a pallet frame 35, on which coded information can be applied for identifying the filling material of the pallet container 1.

Figure 5:
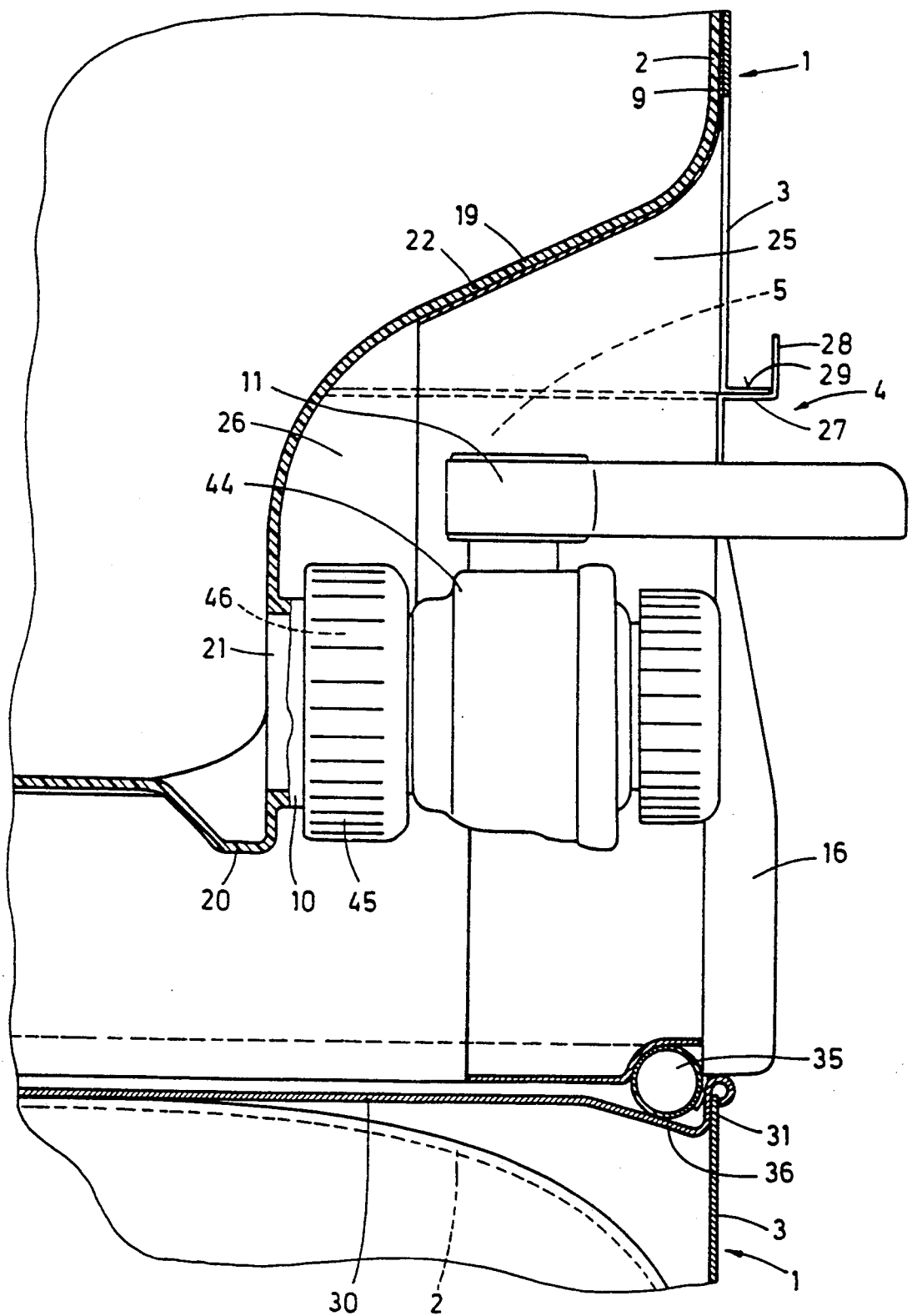
FIG. 5 shows an enlarged longitudinal sectional view of the drainage zone of a pallet container according to FIGS. 1-4, stacked onto a lower container.

The central section of the front wall 9 of the inner container 2 is fashioned in the lower zone as an inwardly curved area 19 to which is molded the drainage connection 10 for mounting the drainage valve 11 disposed within the contour of the inner container 2. The inward curvature 19 of the inner container 2 with the drainage connection 10 and with a bottom residue space 20 underneath the outlet opening 21 in the inwardly curving section 19 is manufactured as a plastic molded part 22 designed in the shape of a hood and formed at the inner container 2 by blow-molding (FIG. 5).

The front wall 23 of the floor pan 5 receiving the inner container 2 exhibits an inwardly curved portion 24 corresponding to the inwardly curved area 19 of the inner container 2; a hood 25 adapted to the inwardly curved portion 19 of the inner container 2 is integrally molded or, as a separate part, welded to the inwardly curved portion 24. In the inwardly bulging portion 24 of the front wall 23 of the floor pan 5 and in the hood 25 adjoining the inward bulge 24, a through opening 26 is provided for accommodating the drainage connection 10 of the inner container 2 inserted from above in the floor pan 5.

The floor pan 5 exhibits a horizontal opening rim 27, interrupted in the region of the inward bulge 24 of the front wall 23, this rim having a web 28 bent upwards at a right angle. The sheet-metal jacket 3 is attached, with a lower rim 29 bent at a right angle, on the opening rim 27 of the floor pan 5 by means of laser welding or with screws.

The floor pan 5 is manufactured as a deep-drawn part from sheet metal; the corner feet 16 and central feet 17 of metal or plastic pertaining to the pallet frame 35 are welded or threaded to this part.

The pallet container 1 is sealed by means of a removable lid 30 of sheet metal, this lid being threaded to the upper rim 31 of the sheet-metal jacket 3 or being clamped onto the rim 31. The lid 30 has an opening 32 in the center for the filling nipple 34, closable by means of a screw lid 33, of the plastic inner container 2.

The pallet frame 35 engages, during stacking of the pallet containers 1, into a marginal depression 36 of the lid 30, attached to the upper rim 31 of the sheet-metal jacket 3, of the respectively lower pallet container 1 and is surrounded flush by the upper rim 31 of the sheet-metal jacket 3 (FIG. 5).

Figure 8:
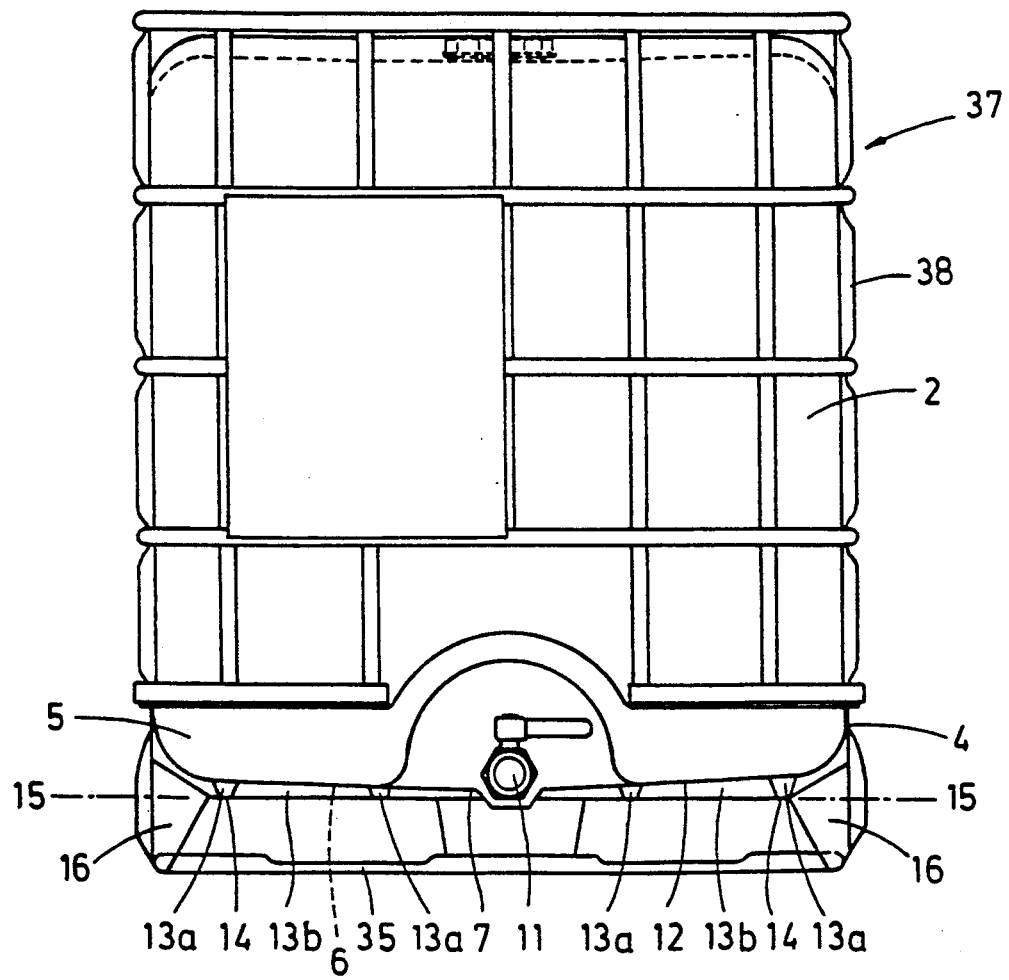
FIG. 8 is a front view of a pallet container with plastic inner container and lattice jacket.
Figure 10:
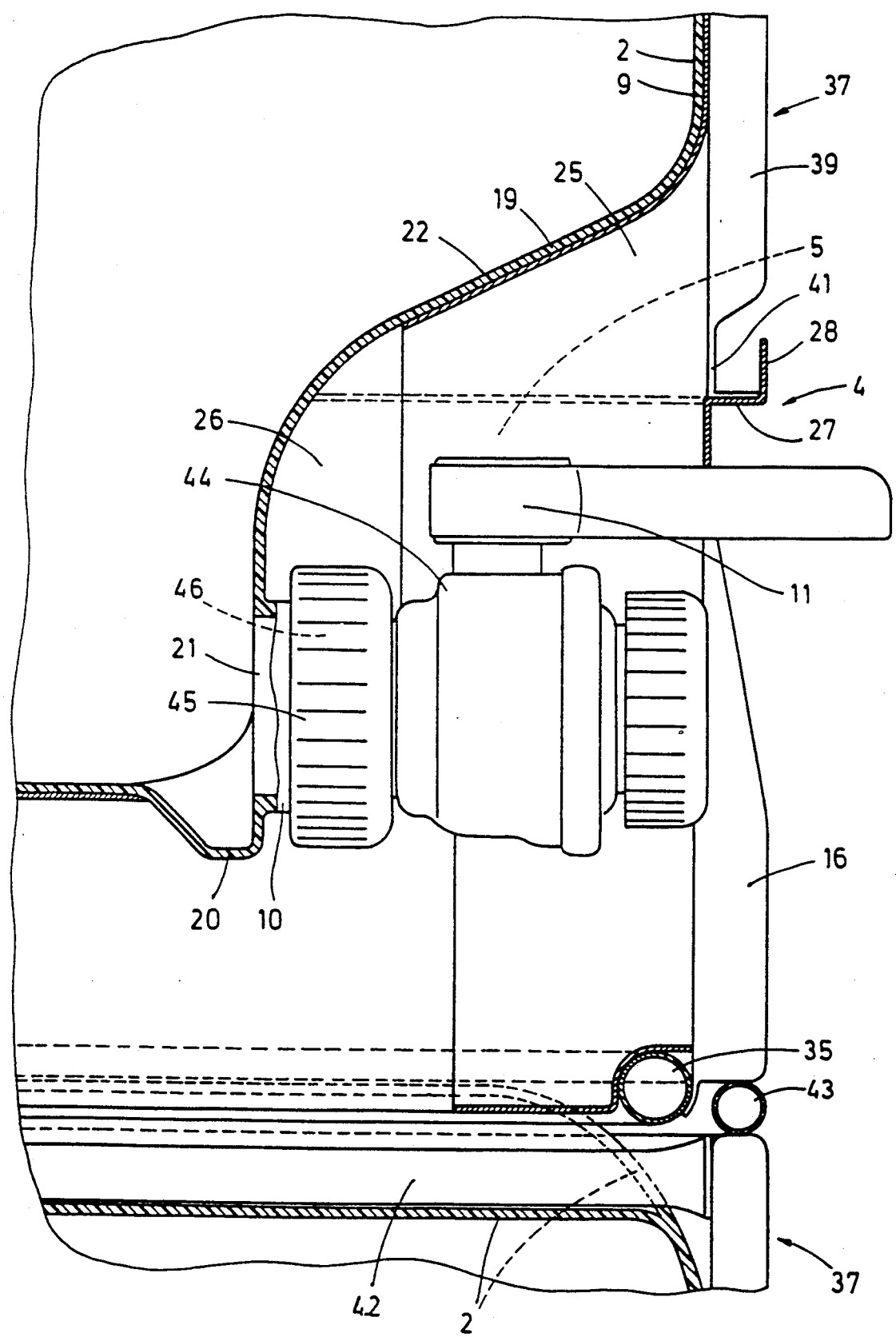
FIG. 10 is an enlarged longitudinal sectional view of the drainage zone of a pallet container according to FIGS. 6-8, stacked onto a lower container.

The pallet container 37 according to FIGS. 6-8 is equipped with a lattice jacket 38 made up of intersecting vertical and horizontal lattice bars 39, 40 of metal. For attaching the lattice jacket 38 to the floor pan 5, the flattened, hook-shaped ends 41 of the vertical lattice bars 39 of round steel are welded or threaded to the opening rim 27 of the floor pan 5 (FIG. 10). In place of a lid, the pallet container 37 has a stiffening frame 42 made up of diagonally arranged tubular struts threaded to the lattice jacket 38 in each case in the lateral center.

Figure 9:
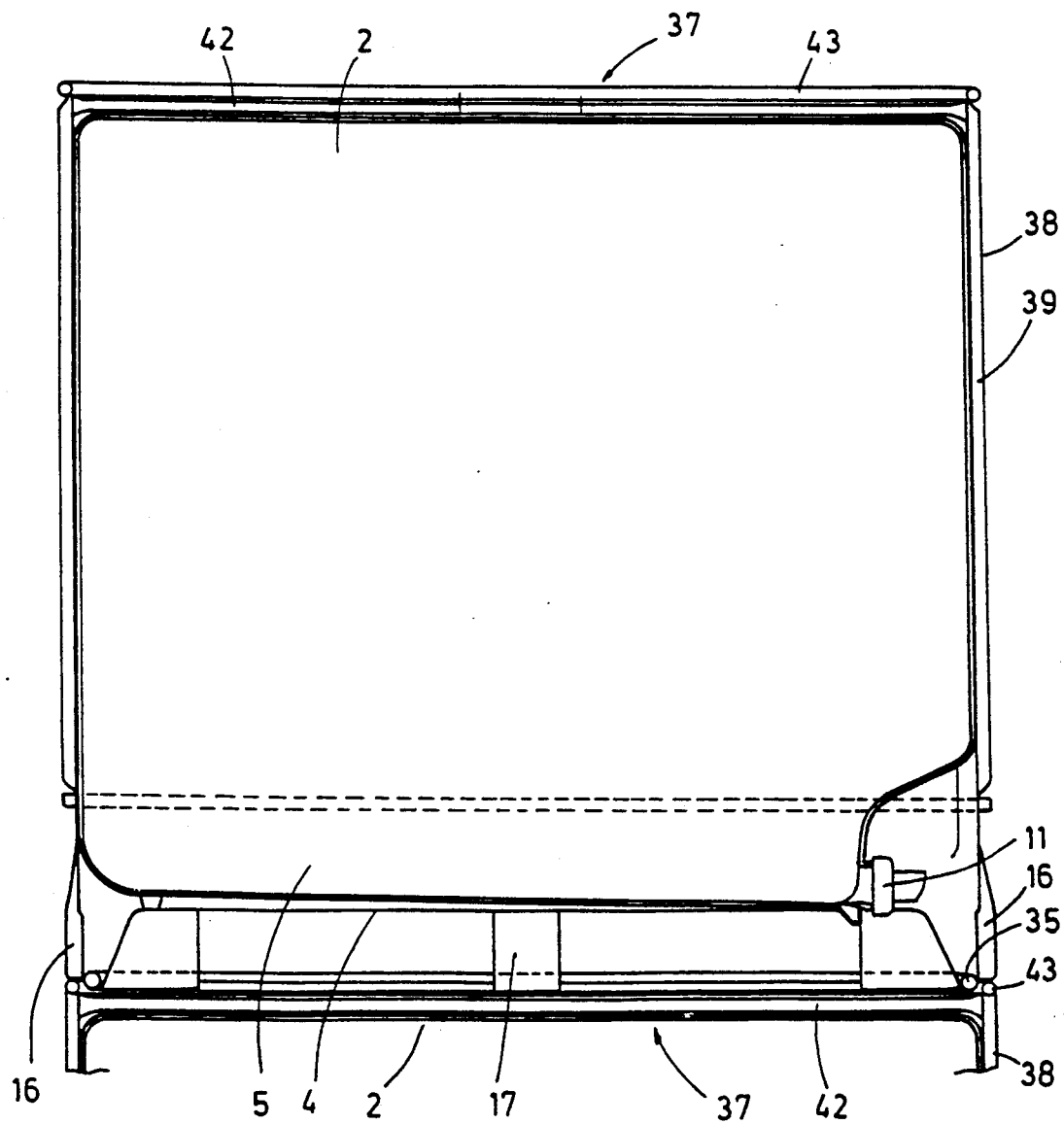
FIG. 9 is an enlarged longitudinal sectional view of a pallet container according to FIGS. 6-8, stacked onto a lower container.

During the stacking of the pallet containers 37 with lattice jacket 38, the pallet frame 35 engages into the upper end profile 43 of the lattice jacket 38 of the respectively lower pallet container 37, and the corner feet 16 and central feet 17 rest on the upper end profile 43 of the lattice jacket 38 of the pallet container 37 on the bottom (FIGS. 9 and 10).

The housing 44 of the drainage cock 11 according to FIG. 5, produced of a synthetic resin, for example polypropylene, is fixedly screwed onto the drainage connection 10 of the inner container 2 by means of a divided screw cap 45 of synthetic resin, the halves of which are welded together on the inlet connection 46 of the valve housing 44.

Figure 11:
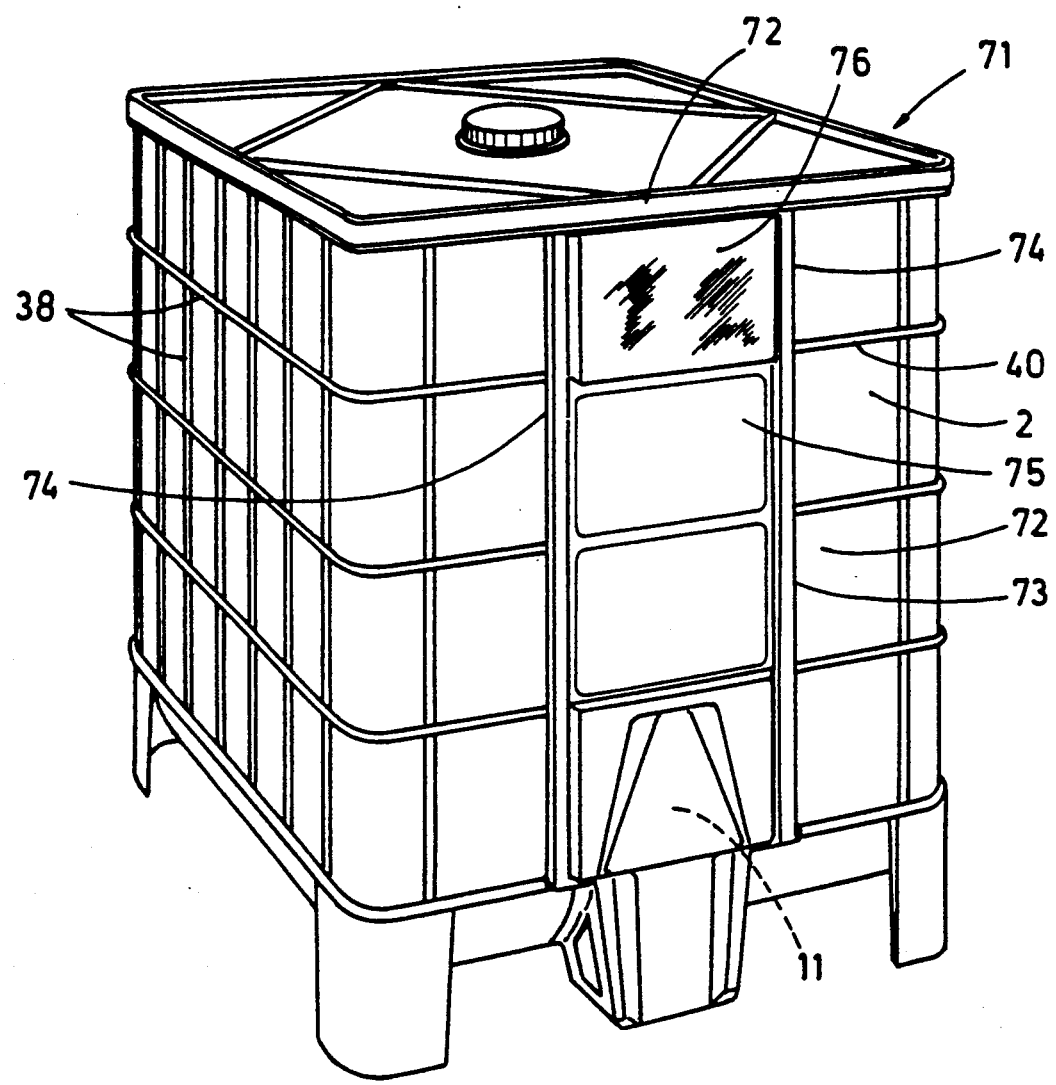
FIG. 11 shows the perspective frontal view of a pallet container with lattice jacket, as well as with a storage cassette for accompanying documents and with a protective panel for the drainage valve.

The lattice jacket 38 of the pallet container 71 according to FIG. 11 comprises a recess 73 on the front face 72 wherein two guide rails 74 located within the lattice jacket contour are welded to the horizontal lattice bars 40. A solid sheet-metal panel 75 as protection against contamination and damage for the drainage valve 11 as well as for the mounting of legends, such as operating instructions, and a flat cassette 76 of sheet metal or plastic, formed integrally with the protective panel 75 or forming a separate part, for storing shipping papers of all kinds, such as product specifications, shipping instructions, environmental information, advertising material, and the like, are inserted in the guide rails 74.

The protective panel 75 can be provided with a safety means against removal, as an originality seal, and for securing the drainage cock 11 against unauthorized opening.

Figure 12:
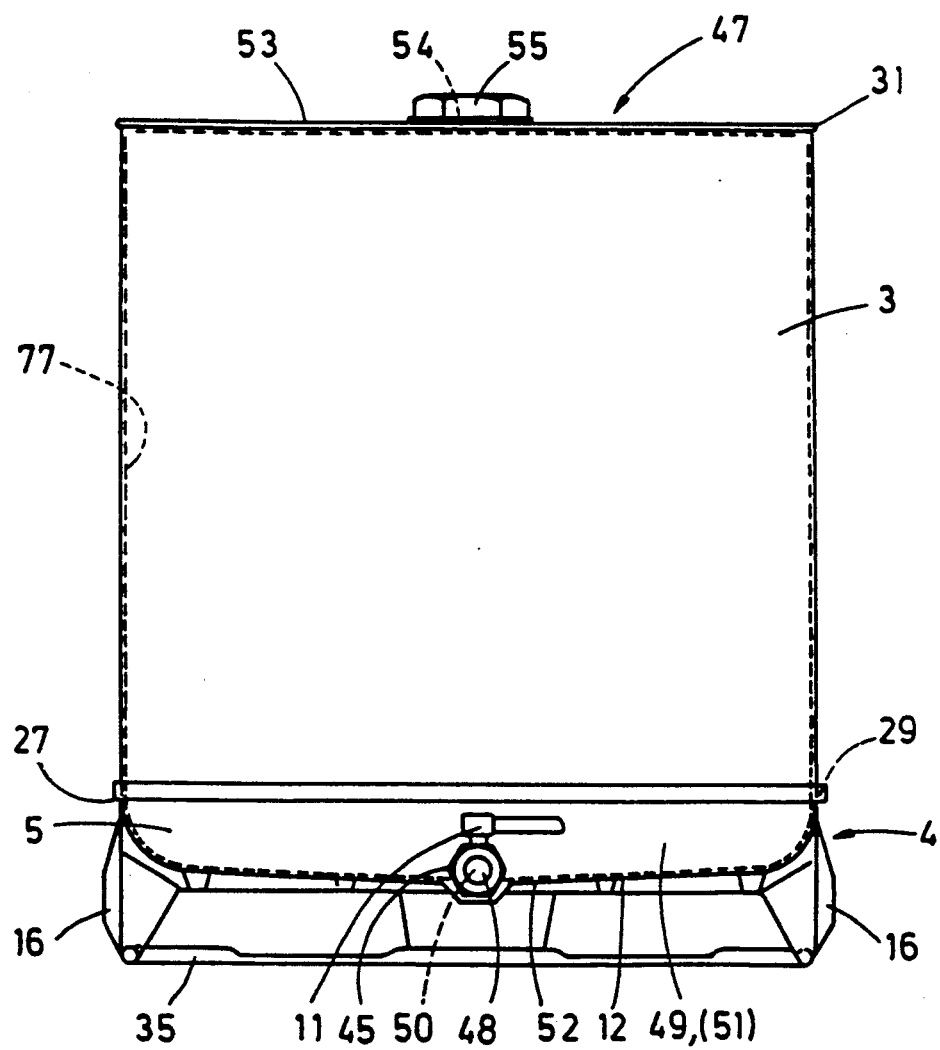
FIG. 12 is a front view of a pallet container designed as a sheet-metal container, with a flexible inside liner.

The pallet container 47 of FIG. 12 lacks a plastic inner container, in contrast to the pallet containers 1, 37, 71. The smooth sheet-metal jacket 3 of the pallet container 47, intended particularly for the grocery industry, is attached with the lower rim 29 bent away at a right angle to the continuously extending opening rim 27 of the floor pan 5 of sheet metal by means of laser welding. The drainage nipple 48 of steel, provided with a connecting thread for the screw cap 45 of the drainage cock 11, is welded to the front wall 49 provided with an outlet opening 50 above the bottoms space of the drainage bottom 12 of the floor pan 5, slightly sloping away from the rear wall 51 toward the front wall 49, with a central, flat drainage channel 52. As in case of the pallet containers 1, 37, 71, projecting corner feet 16 and central feet 17 of sheet metal of a pallet frame 35 made of steel tubes are attached to the pallet 4 designed as a floor pan 5. A sealing lid 53 of sheet metal with a filling connection 54 and a screw lid 55 is welded in liquid-tight fashion to the upper rim 31 of the sheet-metal jacket 3.

The sheet-metal jacket 3 of the pallet container 47 is preferably made of plated sheet metal with an inner sheet of stainless steel and an outer sheet of normal steel.

The pallet container 47 of sheet metal without an inner container can be equipped, just as the pallet containers 1, 37, 71, with a plastic inner container 2 with a flexible inside liner 77 of a welded or blown synthetic resin film or a welded metal-plastic composite film.

In a modification of the above-described pallet containers 1, 37, 47, 71, the floor pan 5 can be produced as a press-molded part of a synthetic resin panel to which corner feet 16 and central feet of plastic are molded, or at which separate corner feet and central feet of plastic or metal are attached.

Figure 13:
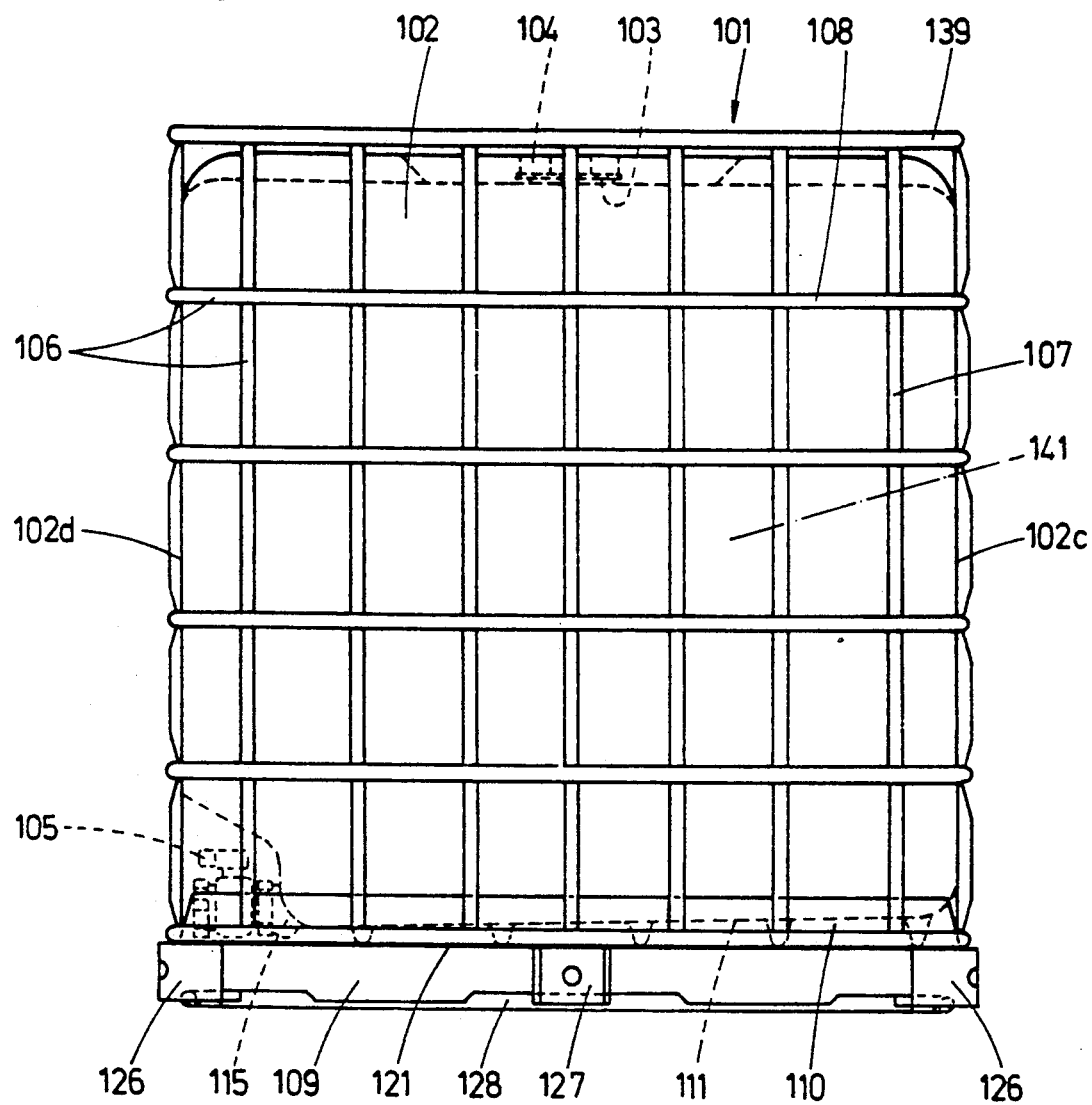
FIG. 13 shows a lateral view.
Figure 14:
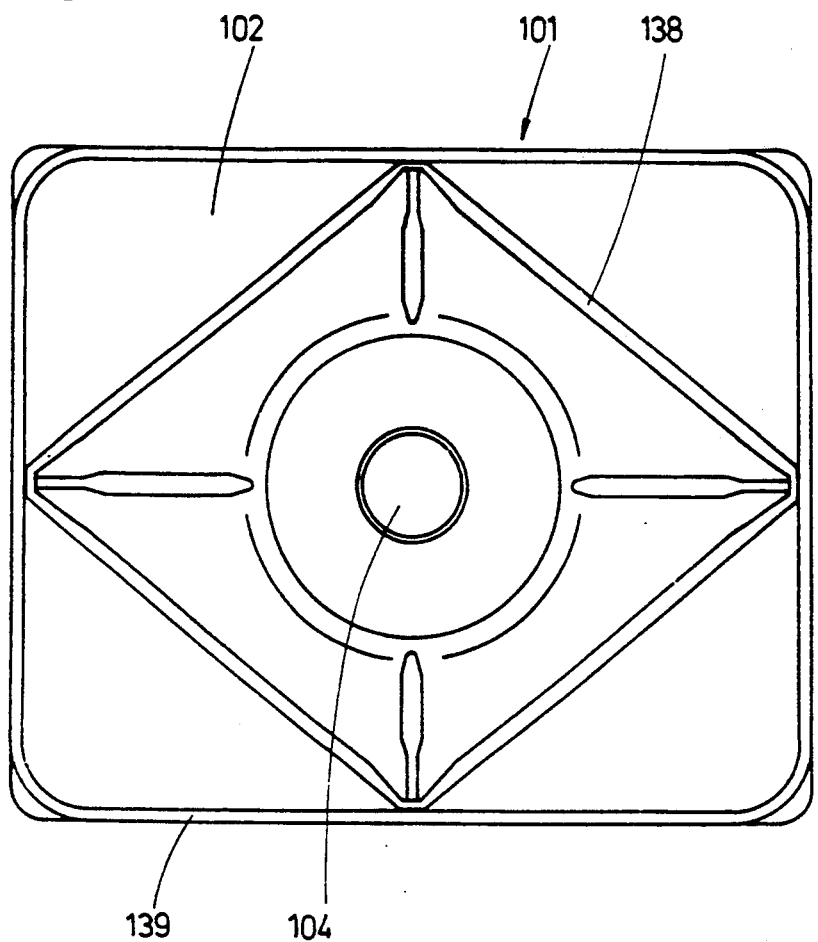
FIG. 14 shows a top view.

The pallet container 101 according to FIGS. 13-15, utilized as a single-use and multiple-trip container and intended for shipping and storing liquid goods comprises, as the main components, an exchangeable inner container 102 of polyethylene with a rectangular contour and rounded corners, equipped with a filling connection 103 closable by a screw cap 104 and with a discharge valve 105, an outer jacket 106 of intersecting vertical and horizontal lattice bars 107, 108 of metal, as well as a pallet 109 designed as a flat floor pan 110 of sheet metal, with length and width dimensions satisfying European standards, for the flush accommodation of the plastic inner container 102.

The bottom 111 of the inner container 102 slopes downwardly from two opposite sidewalls 102a, 102b of the container 102 slightly toward the center of the bottom and furthermore has a slight slope from the rearward 102c toward the forward container wall 102d. In this way, the bottom 111 of the inner container 102 forms a flat drainage channel 112 slightly inclined toward the drainage connection 115 in the front wall 102d to the connection of the drainage valve 105, preferably a ball valve or flap valve.

Figure 18:
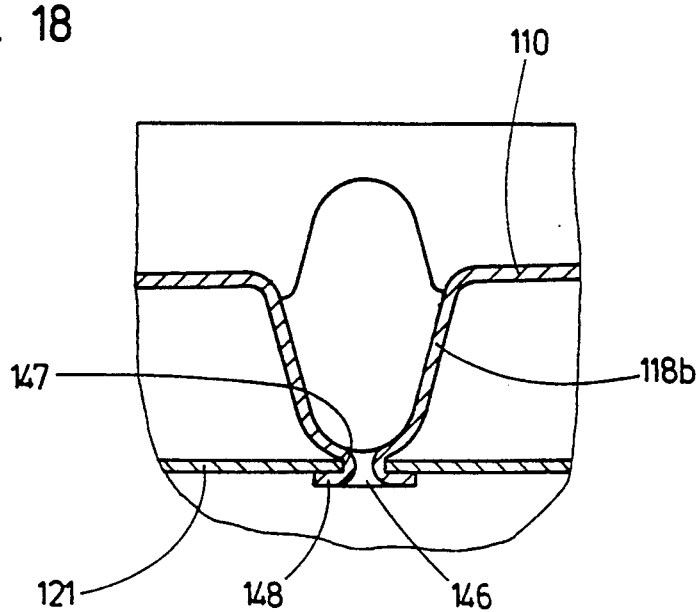
FIG. 18 is a detail according to portion A of FIG. 17.
Figure 16:
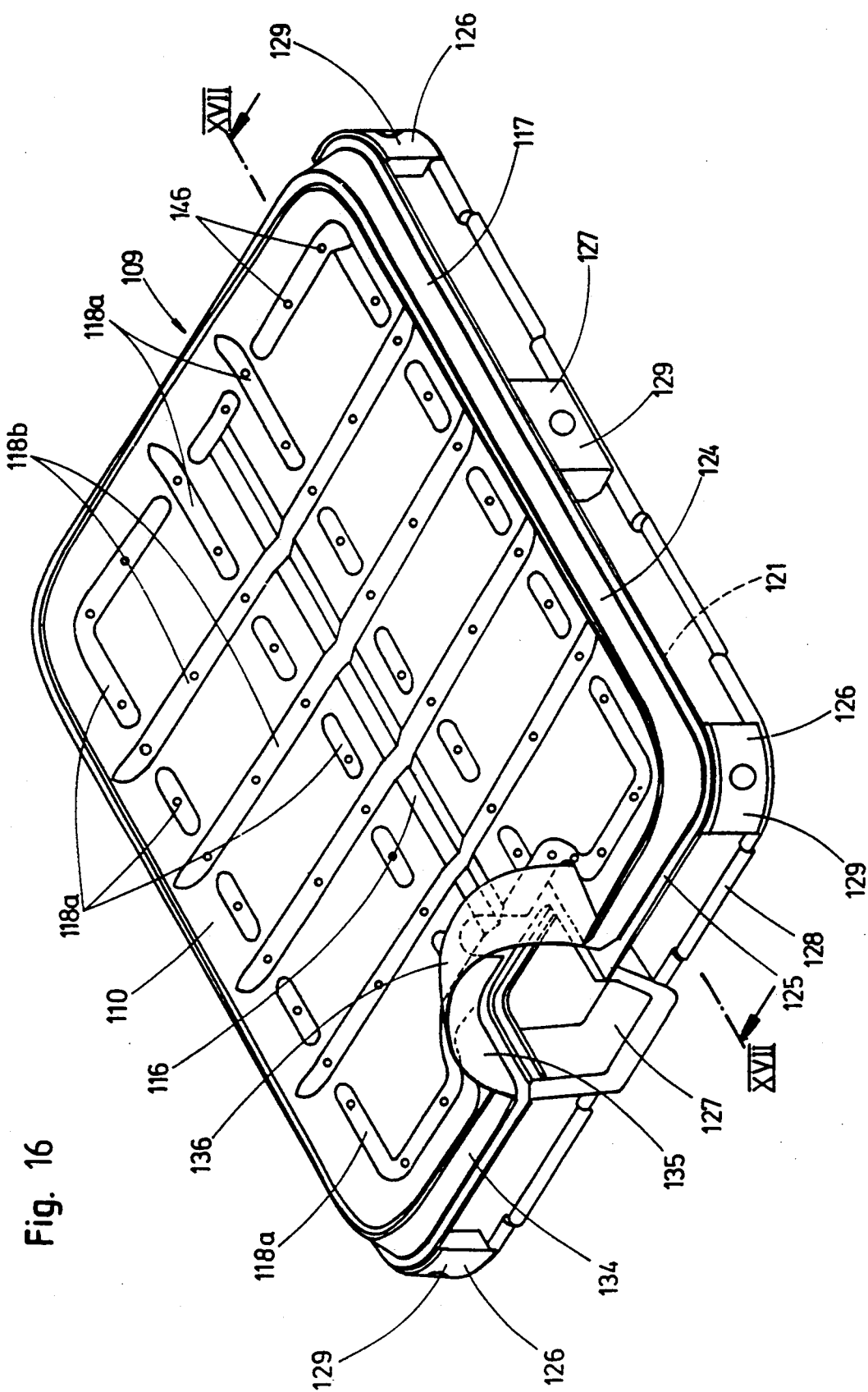
FIG. 16 is a perspective enlarged illustration of the pallet, designed as a floor pan of sheet metal, for the container according to FIGS. 13-15.
Figure 19:
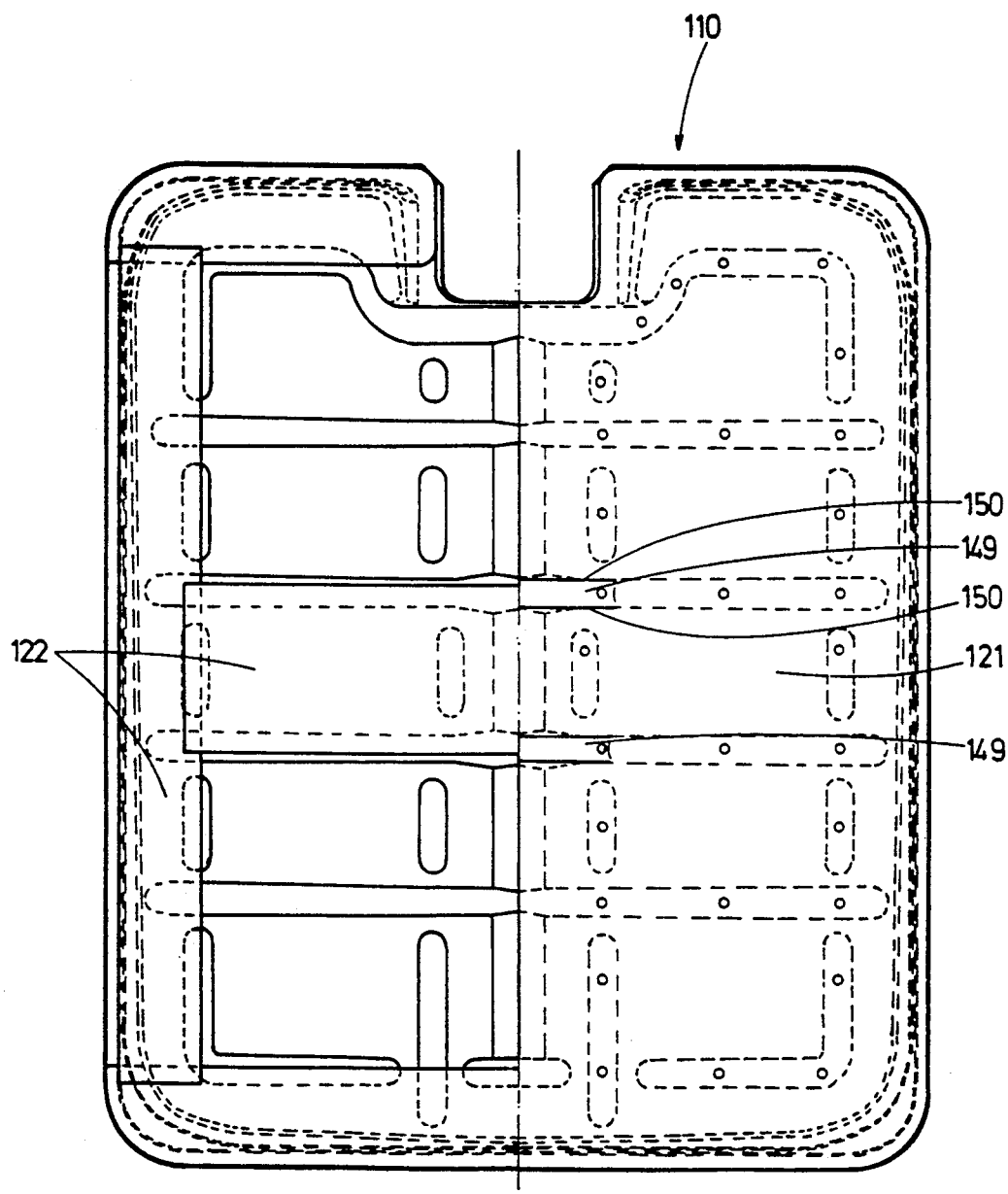
FIG. 19 is a bottom view of the floor pan of the pallet according to FIGS. 16 and 17, in each case with one-half thereof, with a flat lower bottom and a lower frame.

The floor pan 110 of the pallet 109 according to FIGS. 16-18, adapted in the inclination to the drainage bottom 111 of the inner container 102 and deep-drawn from sheet-metal material, with a flat central channel 116 corresponding to the drainage channel 112 of the inner container 102, exhibits a downwardly drawn outer supporting rim 117 and reinforcing creases 118a, 118b extending in the direction of and transversely to the central channel 116, the bases 119 of these creases lying in a joint horizontal plane 120—120.

The floor pan 110 is connected, in the zone of the reinforcing creases 118a, 118b and of the supporting rim 117, with a flat lower bottom 121 or lower frame 122 of sheet metal to form a trough with closed and open hollow chambers 123 and with a continuously extending, hollow supporting collar 124.

For connecting the floor pan 110 and the lower bottom 121 by riveting, hollow rivets 146 are formed from the reinforcing corrugations 118a, 118b of the floor pan 110; these rivets are passed through corresponding rivet holes 147 in the lower bottom 121 and shaped into sealing nubs 148 (FIG. 18).

The hollow rivets 146 form dewatering openings in the floor pan 110. This simple rivet connection contributes toward an increase in the strength of the floor pan 110, requires no separate rivets, serves for draining the floor pan 110, and is not prone to corrosion, in contrast to a welding spot.

There is the possibility of riveting the floor pans 110 and the lower bottoms 121 together at the purchaser's location. In this way, shipping costs are saved since the floor pans 110 can be transported in nestled fashion, and the lower bottoms 121 lying flatly one on top of the other, and thereby the needed transporting volume can be considerably reduced as compared with pallets mounted to assume the finished condition.

A continuously extending marginal strip 125 is angled away from the supporting rim 117 of the floor pan 110 and is folded over the outer rim of the lower bottom 121.

For rigidifying purposes, corrugations 149 with cut-in longitudinal rims 150 can be profiled into the lower bottom 121 (FIG. 17).

Figure 21:
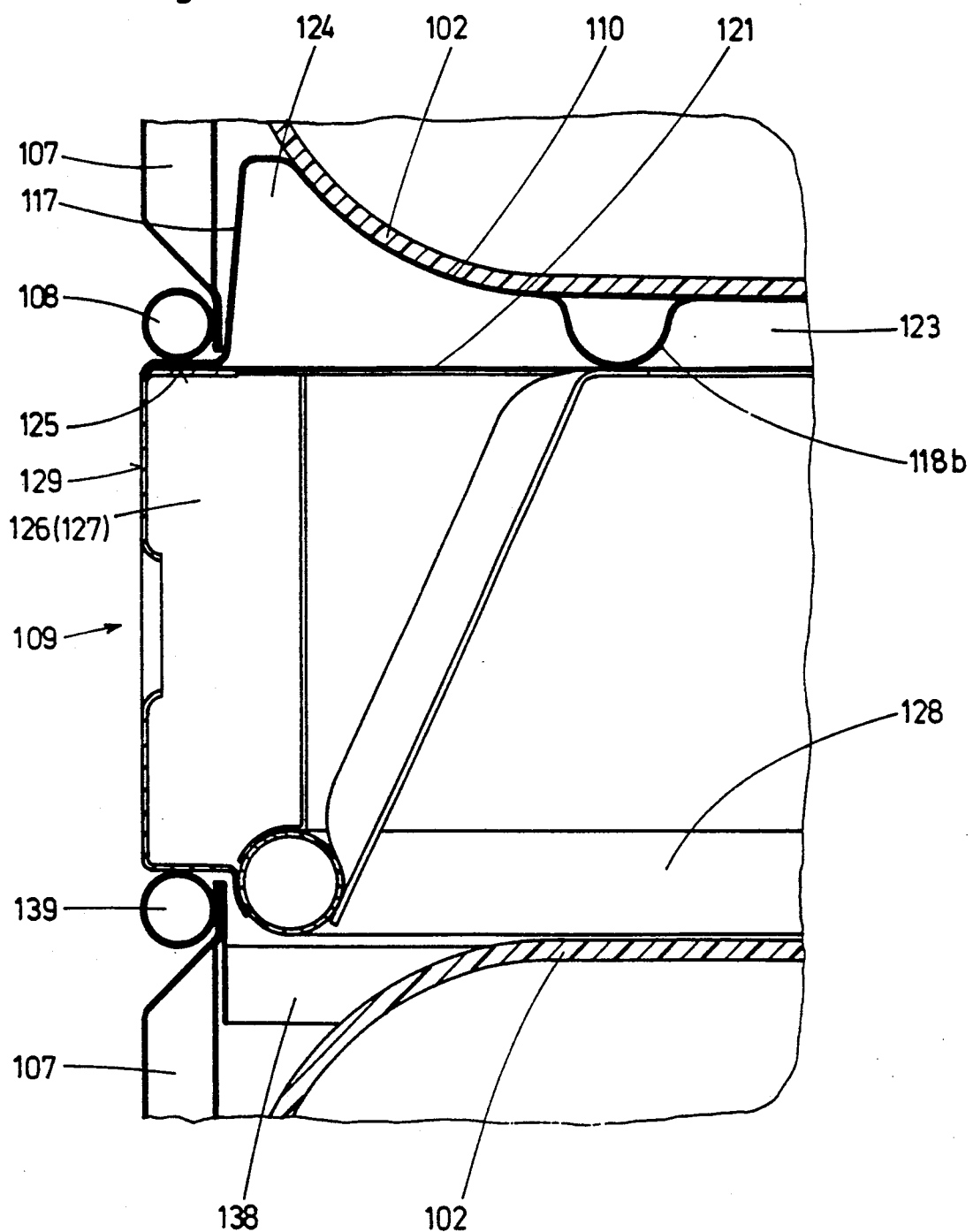
FIG. 21 is a fragmentary longitudinal sectional view of two pallet containers, one stacked upon the other, according to FIGS. 13-15.

The lattice jacket 106, fixed by the continuously extended supporting collar 124 of the floor pan 110, is supported with the lower, continuously extending horizontal lattice bar 108 or with a lower terminal profile on the marginal strip 125 projecting outwardly past the supporting rim 117 of the floor pan 110, and the lower, continuously extending horizontal lattice bar 108 of the lattice jacket 106 is welded to the marginal strip 125, preferably spot-welded, or threaded thereto (FIG. 21).

The lower bottom 121 or lower frame 122 of the floor pan 110 is welded or threaded to the projecting corner feet 126 and central feet 127 of a pallet frame 128 designed as a steel-tube frame. Coded information for identifying the filling material of the pallet container 101 can be applied to the externally located positioning surfaces 129 of the corner feet 126 and central feet 127 (FIG. 21).

Figure 20:
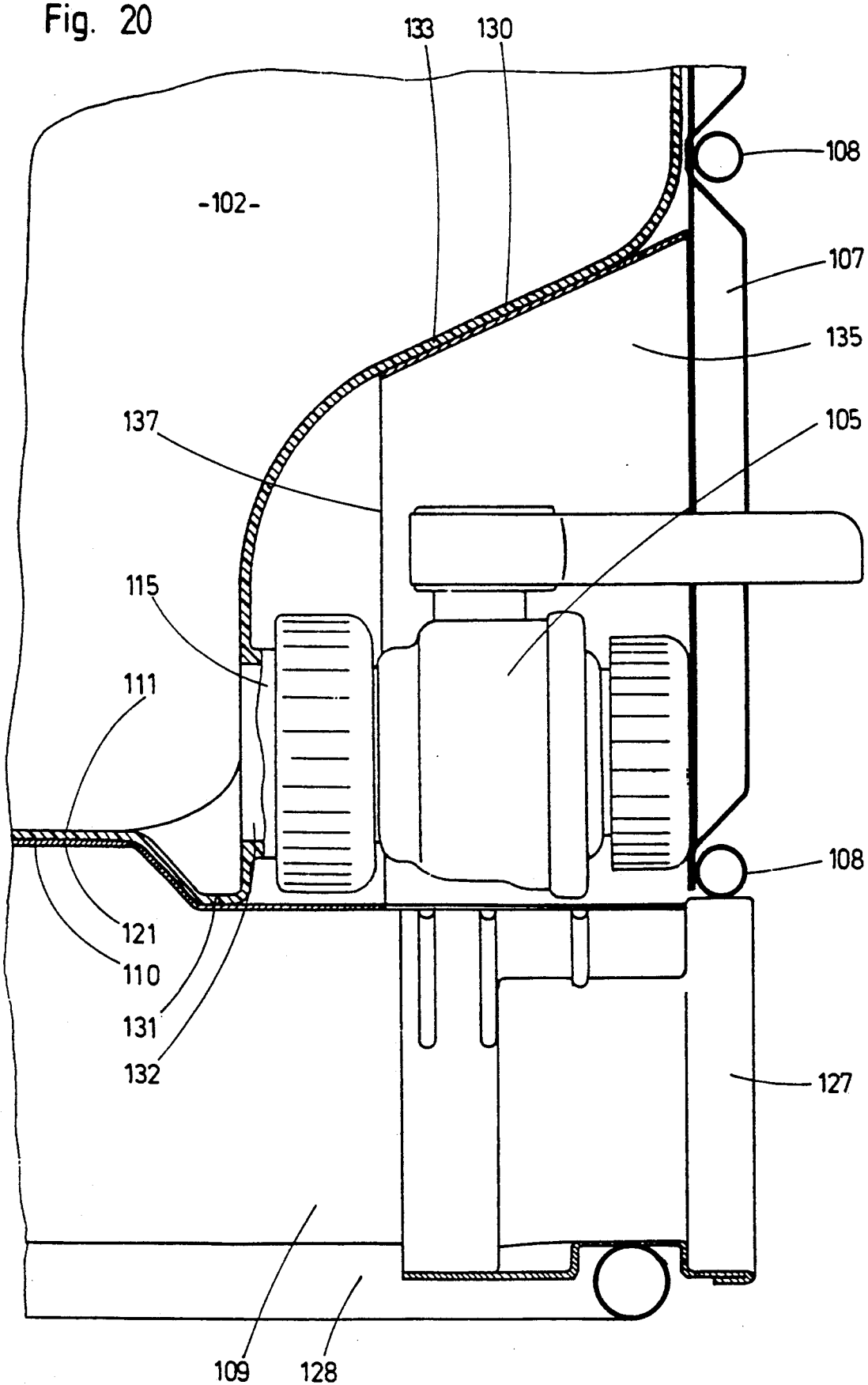
FIG. 20 is an enlarged longitudinal sectional view of the drainage zone of a pallet container according to FIGS. 13-15.

The central section of the front wall 102d of the inner container 102 is designed in the lower zone as an inward bulge 130 to which is molded the drainage connection 115 for mounting the drainage cock 105 disposed within the contour of the inner container 102. The inward bulge 130 of the inner container 102 with the drainage connection 115 and a bottoms residue space 131 underneath the outlet opening 132 in the inward bulge 130 is made of a molded plastic part 133 having the shape of a hood and blow-molded to the inner container 102 (FIG. 20).

The front wall 134 of the floor pan 110 accommodating the inner container 102 exhibits an inward bulge 135 corresponding to the inward bulge 130 of the inner container 102, a hood 136 adapted to the inward bulge 130 of the inner container 102 being welded onto this inward bulge 135; an opening 137 is provided in this hood permitting an unhindered insertion from above and removal of the plastic inner container 102 with the drainage connection 115, projecting from the inward bulge 130, into and, respectively, out of the lattice jacket 106.

The lattice jacket 106 is rigidified by an upper frame 138 of diagonally arranged tubular struts which latter are threaded respectively in the lateral center to the upper terminating profile 139 of the lattice jacket 106 and protect the plastic inner container 102 from above (FIG. 14).

During stacking of the pallet containers 101 with lattice jacket 106, the pallet frame 128 engages into the upper terminating profile 139 of the lattice jacket 106 of the respectively lower pallet container 101 and the projecting corner feet 126 and central feet 127 rest on the upper terminating profile 139 of the lattice jacket 106 of the lower pallet container 101 (FIG. 21).

Figure 22:
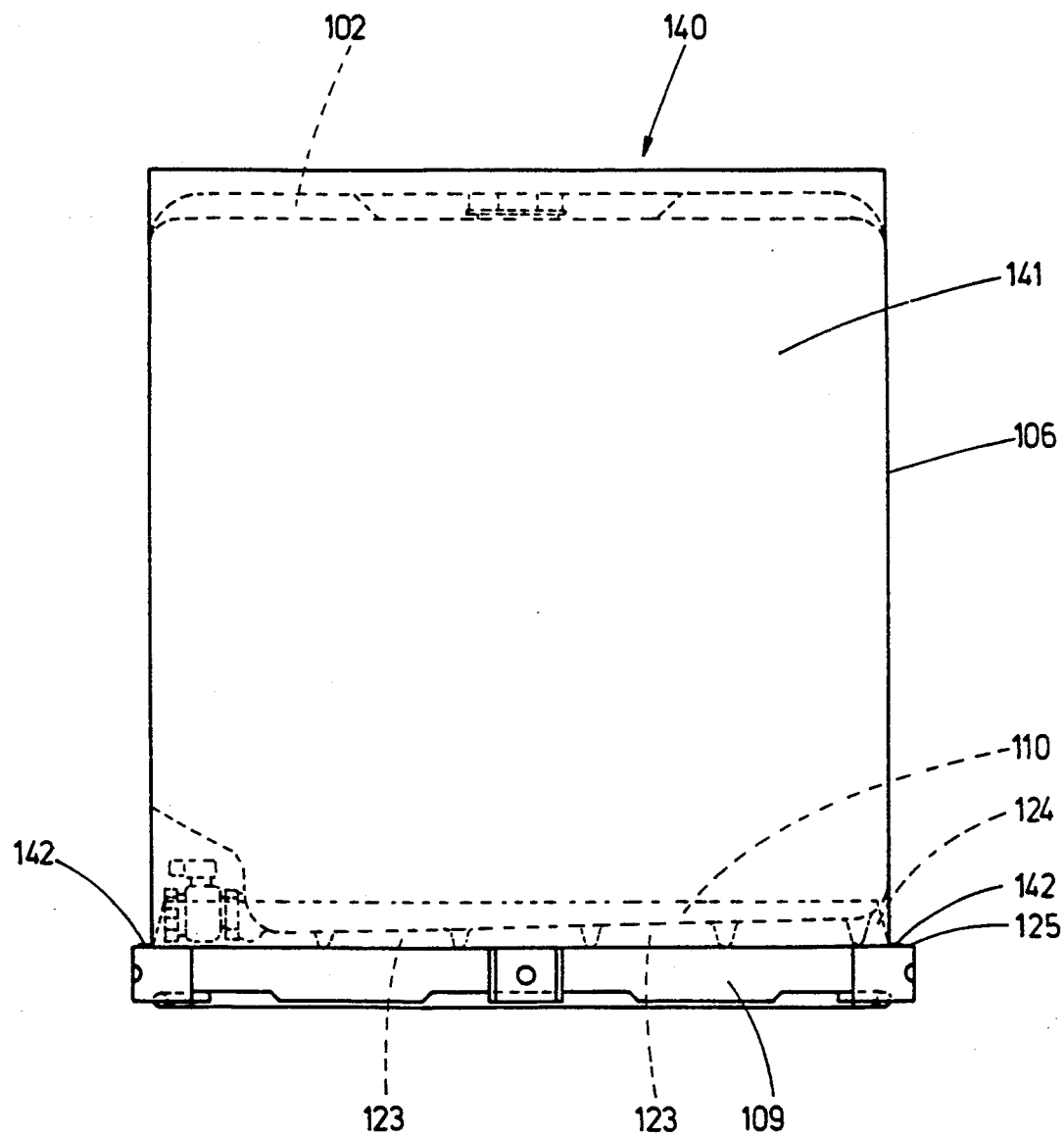
FIG. 22 is a lateral view of a pallet container with a sheet-metal jacket.

The pallet container 140 according to FIG. 22 is, in contrast to the pallet container 101 according to FIGS. 13–21, equipped with a sheet-metal jacket 141 which latter is fixedly welded or fixedly threaded to the marginal strip 125 of the floor pan 110 with a lower rim 142 that is bent away at a right angle.

Figure 23:
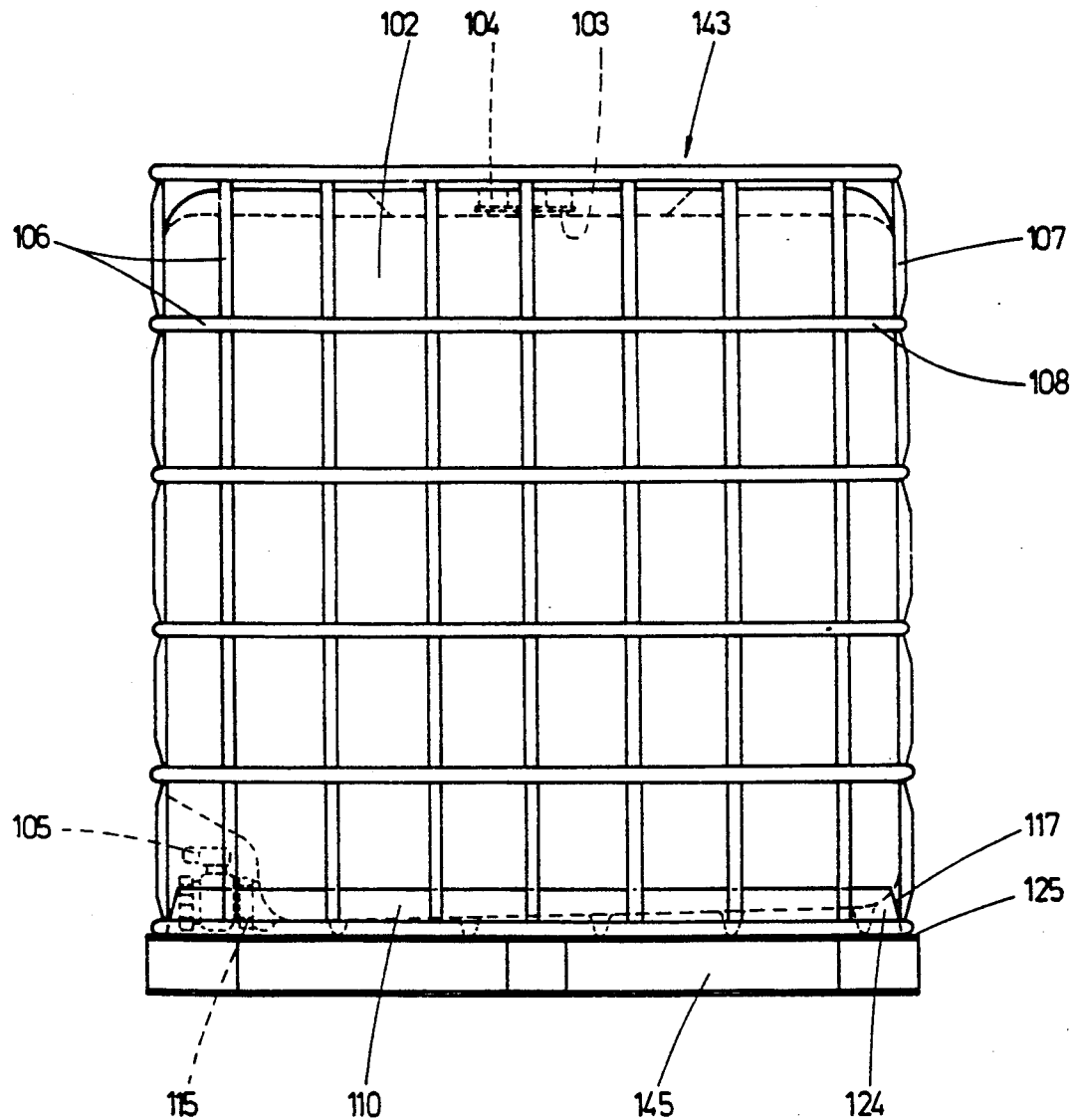
FIG. 23 is a lateral view of a pallet container with wooden pallet.

The flat floor pan 110 of the pallet container 143 according to FIG. 23 is fixedly threaded with the marginal strip 125 without a lower bottom 121 onto a wooden pallet 145 wherein the floor pan 110 rests with the reinforcing creases 118a, 118b on the wooden pallet 145.

There is furthermore the possibility of threading the floor pan 110 of the pallet container 143 according to FIG. 23 with a lower bottom 121 or lower frame 122 onto a wooden pallet 145.

The pallet container 101 of FIG. 13 can be additionally equipped with a sheet-metal jacket 141 inserted between the plastic inner container 102 and the lattice jacket 106 and optionally provided with openings, for example as viewing windows for the control of the liquid material in the plastic inner container 102.

The facility according to FIG. 24 for the manufacture of floor pans 5 of a synthetic resin as pallets for pallet containers comprises, as the primary installation parts, one or several extruders 56 arranged side-by-side, with a fishtail die 57 for the production of a continuous extruded length 58 of synthetic resin made of fresh and reprocessed granulated material, for example granulated polyethylene, a first rolling device 59 for rolling a plastic strip 60, metering devices 61 for adding fillers, such as wood chips and paper cuttings, mineral fibers, and the like, a second rolling device 62 for rolling a strip 63 having a predetermined strip thickness, a separating means 64 for cutting panels 65 from the plastic strip 63, a heating device 66 for the plastic panels 65, a press 67 for producing floor pans 5 from the plastic panels 65, and a cooling device 68 for the press-molded floor pans 5.

The facility can additionally be equipped with a device 69, located upstream of the second rolling device 62, for feeding fabric strip 70, film strip, or the like, to be combined with the plastic strip 60 by rolling to serve as the reinforcing insert.

What is claimed is:

1. In a pallet container for liquids, having an inner container of a synthetic resin with respectively one sealable filling and discharge opening, an outer jacket of metal in contact with the inner container and a bottom fashioned as a pallet, wherein the pallet is adapted for handling by means of stacker lifting truck or shelf-servicing device, the improvement wherein the pallet comprises a floor pan for flush accommodation of the inner container and for selective mounting of a sheet-metal or lattice jacket, said inner container having a front wall, a rear wall, and a bottom designed as a drainage bottom with a central, flat drainage channel extending with a slight slope from the rear wall to a drainage connection arranged at the front wall for mounting a drainage valve, said floor pan having a bottom adapted to the drainage bottom of the inner container and exhibiting reinforcing creases, said creases having bases which lie in a joint, horizontal plane; and said floor pan being attached on a pallet frame.

2. Pallet container according to claim 1, wherein the floor pane exhibits a downwardly drawn outer supporting rim and is connected in a region of the reinforcing creases and of the supporting rim, with a flat lower bottom to form a hollow chamber bottom with chambers and with a continuously extending, outer hollow supporting collar, said floor pan being attached with the lower bottom to corner feet and central feet of said pallet frame.

3. Pallet container according to claim 2, further including hollow rivets formed from the reinforcing creases of the floor pan and passed through corresponding rivet holes in the lower bottom for riveting the floor pan and the lower bottom together, said hollow rivets forming drainage openings in the floor pan.

4. Pallet container according to claim 2, further including a marginal strip angled away from the supporting rim of the floor pan for supporting and for mounting said lattice or said sheet-metal jacket, said marginal strip being folded around the outer rim of the lower bottom.

5. Pallet container according to claim 4, wherein the floor pan, in the region of the reinforcing creases and of the marginal strip, is welded to the lower bottom.

6. Pallet container according to claim 1, wherein the floor pan has a profiled lower bottom.

7. Pallet container according to claim 6, wherein the lower bottom has reinforcing creases with cut-in longitudinal rims.

8. Pallet container according to claim 1, wherein the pallet frame has corner feet and central feet, and engages, during stacking of pallet containers with sheet-metal jacket, into a marginal indentation of a lid attached to an upper rim of the sheet-metal jacket, said pallet frame being encompassed in shape-mating fashion by the upper rim of the sheet-metal jacket.

9. Pallet container according to claim 8, further including coded information for identification of the filling material, applied to positioning surfaces of at least one of the corner feet and the central feet.

10. Pallet container according to claim 1, wherein the floor pan has a horizontal opening rim for attachment of a sheet-metal jacket or of bars of a lattice jacket.

11. Pallet container according to claim 10, further including a web, bent away upwardly at a right angle from the horizontal opening rim of the floor pan, for positioning the sheet-metal jacket or lattice jacket.

12. Pallet container according to claim 1, wherein a central lower section of the front wall of the inner container is designed as an inward bulge, at which is formed the drainage connection for mounting said drainage valve, said floor pan having a front wall which has an inward bulge corresponding to the inward bulge of the inner container, at which is positioned a hood adapted to the inward bulge of the inner container, and a through opening for accommodating the drainage connection of the inner container in the inward bulge of the front wall of the floor pan and in the hood.

13. Pallet container according to claim 12, wherein the inward bulge of the inner container is made as a molded plastic part designed as a hood with the drainage connection and a residual bottoms space, said part being blow-molded to the inner container.

14. Pallet container according to claim 1, wherein the drainage valve comprises a housing made of plastic, said housing being fixedly threaded to the drainage connection of the inner container by means of a divided screw cap of plastic, said screw cap having two halves which are welded together on an inlet connection of the valve housing.

15. Pallet container according to claim 1, wherein the floor pan is manufactured as a deep-drawn part of sheet metal.

16. Pallet container according to claim 1, wherein the floor pan is manufactured as a press-molded part from a synthetic resin panel.

17. Pallet container according to claim 1, further including a lattice jacket having horizontal lattice bars, a recess on a front side of the pallet container and two guide rails, mounted in the recess at the horizontal lattice bars and located within the lattice jacket contour, for insertion of a solid sheet-metal panel as protection against contamination and damage for the drainage valve, said sheet-metal panel adapted to hold a flat cassette for the storage of documents.

18. Pallet container according to claim 17, further including a safety means against removal of the protective panel, and for securing the drainage valve against unauthorized opening.

19. Pallet container according to claim 1, further including a sheet-metal jacket in contact with the inner container and an external lattice jacket supporting said sheet-metal jacket.

20. Pallet container according to claim 19, further including openings in the jacket serving as viewing windows for controlling liquid goods in the inner container.

21. In a pallet container for liquids, with a bottom designed as a pallet, wherein the pallet is adapted for handling by means of stacker lifting truck, or shelf-serving device, the improvement wherein the pallet is designed as a floor pan of sheet-metal with an opening rim with which a container jacket of sheet-metal is welded or threaded together in liquid-tight fashion, said pan having a front wall, a rear wall, and a bottom designed as a drainage bottom with a central, flat drainage channel which extends with a slight slope from the pan rear wall to a drainage connection, arranged on the front wall of the floor pan and having a drainage valve, said drainage bottom of the floor pan exhibiting reinforcing creases with bases which lie in a joint horizontal plane, and corner feet and central feet with positioning surfaces, which feet project outwards and are attached to the floor pan; and a sealing lid with a filling connection and a screw lid attached in liquid-tight fashion to an upper rim of the sheet-metal jacket.

22. Pallet container according to claim 1, further including an inner container equipped with an outer jacket and a flexible inside liner of plastic film or of a metal-plastic composite film.

* * * * *